(12) United States Patent
Peled et al.

(10) Patent No.: US 8,478,824 B2
(45) Date of Patent: Jul. 2, 2013

(54) APPARATUS AND METHOD FOR CONTROLLING UNAUTHORIZED DISSEMINATION OF ELECTRONIC MAIL

(75) Inventors: Ariel Peled, Even-Yehuda (IL); Ofir Carny, Kochav-Yair (IL)

(73) Assignee: PortAuthority Technologies Inc., San Diego, CA (US)

( * ) Notice: Subject to any disclaimer, the term of this patent is extended or adjusted under 35 U.S.C. 154(b) by 1531 days.

(21) Appl. No.: 10/357,201

(22) Filed: Feb. 4, 2003

(65) Prior Publication Data

US 2003/0149732 A1      Aug. 7, 2003

Related U.S. Application Data

(60) Provisional application No. 60/353,997, filed on Feb. 5, 2002.

(51) Int. Cl.
*G06F 15/16*          (2006.01)
(52) U.S. Cl.
USPC .......................... 709/206; 709/204; 709/205
(58) Field of Classification Search
USPC ...... 709/204–206, 217–219, 246; 726/11–13, 726/26–30; 713/160–161
See application file for complete search history.

(56) References Cited

U.S. PATENT DOCUMENTS

| | | | |
|---|---|---|---|
| 5,278,955 A * | 1/1994 | Forte et al. | 709/206 |
| 5,440,723 A | 8/1995 | Arnold et al. | |
| 5,444,779 A | 8/1995 | Daniele | |
| 5,870,744 A | 2/1999 | Sprague | |
| 6,006,332 A | 12/1999 | Rabne et al. | |
| 6,076,105 A | 6/2000 | Wolff et al. | |
| 6,115,533 A | 9/2000 | Tahara et al. | |
| 6,167,136 A | 12/2000 | Chou | |
| 6,282,175 B1 | 8/2001 | Steele et al. | |
| 6,324,650 B1 | 11/2001 | Ogilvie | |
| 6,332,030 B1 | 12/2001 | Manjunath et al. | |
| 6,370,574 B1 | 4/2002 | House et al. | |
| 6,430,177 B1 * | 8/2002 | Luzeski et al. | 370/356 |
| 6,646,676 B1 | 11/2003 | DaGraca et al. | |
| 6,651,099 B1 | 11/2003 | Dietz et al. | |
| 6,691,156 B1 | 2/2004 | Drummond et al. | |
| 6,725,371 B1 | 4/2004 | Verhoorn, III et al. | |
| 6,732,101 B1 * | 5/2004 | Cook | 707/10 |

(Continued)

FOREIGN PATENT DOCUMENTS

| | | |
|---|---|---|
| DE | 19734585 | 2/1999 |
| GB | 2350747 | 12/2000 |

(Continued)

OTHER PUBLICATIONS

Official Action Dated Jan. 5, 2009 From the US Patent and Trademark Office Re.: U.S. Appl. No. 10/927,044.

(Continued)

*Primary Examiner* — Kenny Lin (57) ABSTRACT

A method for classification and enforcement of security requirements in an information dissemination system, said information dissemination system not being designed for said security requirements and enforcement. The method comprising the steps of: accepting a user specification of said security requirements for dissemination of respective information, said specifying is done using a user interface; Associating with said dissemination system an enforcement module, said module being operable to receive said security requirements and apply them to control dissemination via said dissemination system, and then enforcing said dissemination via said module.

26 Claims, 5 Drawing Sheets

U.S. PATENT DOCUMENTS

| | | | |
|---|---|---|---|
| 6,732,149 B1 | 5/2004 | Kephart | |
| 6,826,609 B1* | 11/2004 | Smith et al. | 709/225 |
| 6,920,482 B1* | 7/2005 | Fujiyoshi | 709/206 |
| 7,003,731 B1* | 2/2006 | Rhoads et al. | 715/768 |
| 7,107,618 B1* | 9/2006 | Gordon et al. | 726/24 |
| 7,240,209 B2 | 7/2007 | Carro | |
| 7,249,175 B1 | 7/2007 | Donaldson | |
| 2001/0034849 A1* | 10/2001 | Powers | 713/202 |
| 2001/0046069 A1* | 11/2001 | Jones | 358/402 |
| 2001/0049790 A1 | 12/2001 | Faccin et al. | |
| 2002/0078158 A1* | 6/2002 | Brown et al. | 709/206 |
| 2002/0104026 A1* | 8/2002 | Barra et al. | 713/202 |
| 2002/0112015 A1* | 8/2002 | Haynes | 709/206 |
| 2002/0120581 A1 | 8/2002 | Schiavone et al. | |
| 2002/0120692 A1* | 8/2002 | Schiavone et al. | 709/206 |
| 2002/0120869 A1* | 8/2002 | Engstrom | 713/201 |
| 2002/0124052 A1* | 9/2002 | Brown et al. | 709/206 |
| 2002/0129140 A1 | 9/2002 | Peled et al. | |
| 2002/0140986 A1* | 10/2002 | Takayama | 358/402 |
| 2002/0169954 A1* | 11/2002 | Bandini et al. | 713/153 |
| 2002/0194280 A1* | 12/2002 | Altavilla et al. | 709/206 |
| 2002/0194308 A1* | 12/2002 | Hall | 709/219 |
| 2003/0055907 A1* | 3/2003 | Stiers | 709/206 |
| 2003/0093518 A1* | 5/2003 | Hiraga | 709/224 |
| 2003/0126463 A1* | 7/2003 | Sistla | 713/201 |
| 2003/0135564 A1* | 7/2003 | Tsuchiya | 709/206 |
| 2003/0149732 A1 | 8/2003 | Peled et al. | |
| 2003/0152207 A1* | 8/2003 | Ryan | 379/201.04 |
| 2003/0229673 A1* | 12/2003 | Malik | 709/207 |
| 2004/0025057 A1* | 2/2004 | Cook | 713/201 |
| 2004/0049696 A1* | 3/2004 | Baker et al. | 713/201 |
| 2004/0059786 A1* | 3/2004 | Caughey | 709/206 |
| 2004/0533677 | 4/2004 | Peled et al. | |
| 2004/0136513 A1* | 7/2004 | Chiu | 379/100.08 |
| 2004/0177271 A1 | 9/2004 | Arnold et al. | |
| 2005/0025291 A1 | 2/2005 | Peled et al. | |
| 2005/0138353 A1 | 6/2005 | Spies et al. | |
| 2010/0023754 A1 | 1/2010 | Peled et al. | |

FOREIGN PATENT DOCUMENTS

| | | |
|---|---|---|
| JP | 11-110556 | 4/1999 |
| JP | 2000-353133 | 12/2000 |
| JP | 2004-533677 | 11/2004 |
| WO | WO 98/33340 | 7/1998 |
| WO | WO 02/77847 | 3/2002 |

OTHER PUBLICATIONS

OA Jan. 5, 2009.
OA of May 23, 2008.
OA of Jan. 3, 2008.
Official Action Dated Feb. 22, 2008 From the US Patent and Trademark Office Re.: U.S. Appl. No. 10/003,269.
Official Action Dated Jun. 25, 2007 From the US Patent and Trademark Office Re.: U.S. Appl. No. 10/003,269.
Official Action Dated Mar. 13, 2009 From the US Patent and Trademark Office Re.: U.S. Appl. No. 10/003,269.
Notice of Allowance Dated Jun. 30, 2009 From the US Patent and Trademark Office Re.: U.S. Appl. No. 10/003,269.
Official Action Dated Nov. 23, 2005 From the US Patent and Trademark Office Re.: U.S. Appl. No. 10/003,269.
Examiner's Report Dated Jan. 17, 2007 From the Australian Government, IP Australia Re.: Application No. 2002225312.
International Preliminary Examination Report Dated Dec. 6, 2002 From the International Preliminary Examining Authority Re.: Application No. PCT/IL02/00037.
International Search Report Dated Jun. 5, 2002 From the International Searching Authority Re.: Application No. PCT/IL02/00037.
Official Action Dated Mar. 5, 2007 From the US Patent and Trademark Office Re.: U.S. Appl. No. 10/003,269.
Official Action Dated Aug. 10, 2006 From the US Patent and Trademark Office Re.: U.S. Appl. No. 10/003,269.
Official Action Dated Nov. 14, 2008 From the US Patent and Trademark Office Re.: U.S. Appl. No. 10/003,269.
Official Action Dated Aug. 25, 2009 From the US Patent and Trademark Office Re.: U.S. Appl. No. 10/927,044.
Response Dated Mar. 17, 2010 to Official Action of Nov. 18, 2009 From the US Patent and Trademark Office Re.: U.S. Appl. No. 10/357,201.
Translation of Notice of Reason for Rejection Dated Oct. 31, 2008 From the Japanese Patent Office Re.: Application No. 2002-575825.
Official Action Dated Dec. 8, 2010 From the US Patent and Trademark Office Re.: U.S. Appl. No. 10/927,044.
Response Dated Nov. 3, 2010 to Official Action of Jun. 7, 2010 From the US Patent and Trademark Office Re.: U.S. Appl. No. 10/927,044.
Communication Pursuant to Article 94(3) EPC Dated Nov. 13, 2009 From the European Patent Office Re.: Application No. 02715694.2.
Office Action Dated Oct. 18, 2009 From the Israeli Patent Office Re.: Application No. 170428 and Its Translation Into English.
Response Dated Dec. 1, 2009 to Requisition of the Examiner of Jun. 2, 2009 From the Canadian Intellectual Property Office Re.: Application No. 2,220,866.
Response Dated Sep. 1, 2011 to Official Action of May 27, 2011 From the US Patent and Trademark Office Re. U.S. Appl. No. 12/574,787.
Response Dated Sep. 1, 2010 to Office Action of Apr. 27, 2010 From the Israeli Patent Office Re.: Application No. 170428.
Office Action Dated Jan. 3, 2008 From the Israeli Patent Office Re.: Application No. 157810.
Official Action Dated Jun. 8, 2009 From the US Patent and Trademark Office Re.: U.S. Appl. No. 10/357,201.
Official Action Dated Mar. 9, 2007 From the US Patent and Trademark Office Re.: U.S. Appl. No. 10/357,201.
Official Action Dated Jul. 16, 2007 From the US Patent and Trademark Office Re.: U.S. Appl. No. 10/357,201.
Official Action Dated Jun. 17, 2008 From the Japanese Patent Office Re.: Application No. 2002-575825.
Official Action Dated Oct. 18, 2010 From the US Patent and Trademark Office Re. U.S. Appl. No. 12/574,787.
Official Action Dated Jan. 19, 2010 From the US Patent and Trademark Office Re.: U.S. Appl. No. 10/927,044.
Official Action Dated May 21, 2008 From the US Patent and Trademark Office Re.: U.S. Appl. No. 10/357,201.
Official Action Dated May 23, 2008 From the US Patent and Trademark Office Re.: U.S. Appl. No. 10/927,044.
Official Action Dated Nov. 29, 2007 From the US Patent and Trademark Office Re.: U.S. Appl. No. 10/357,201.
Official Action Dated Jul. 31, 2006 From the US Patent and Trademark Office Re.: U.S. Appl. No. 10/357,201.
Requisition by the Examiner Dated Jun. 2, 2009 From the Canadian Intellectual Property Office Re.: Application No. 2,440,866.
Response Dated Feb. 15, 2010 to Office Action of Oct. 18, 2009 From the Israeli Patent Office Re.: Application No. 170428.
Response Dated Feb. 24, 2010 to Communication Pursuant to Article 94(3) EPC of Nov. 13, 2009 From the European Patent Office Re.: Application No. 02715694.2.
Sato et al. "Information Distribution Platform Leading the 21st Century Networked Society II, Rights Management", NTT Technical Journal, The Telecommunications Association (TTA), 12(11): 26-30, Nov. 1, 2000.
Response Dated Jan. 18, 2011 to Official Action of Oct. 18, 2010 From the US Patent and Trademark Office Re. U.S. Appl. No. 12/574,787.
Official Action Dated Feb. 10, 2012 From the US Patent and Trademark Office Re.: U.S. Appl. No. 10/927,044.
Notice of Allowance Dated Apr. 7, 2011 From the Canadian Intellectual Property Office Re.: Application No. 2,440,866.
Official Action Dated Oct. 5, 2011 From the US Patent and Trademark Office Re.: U.S. Appl. No. 10/927,044.
Official Action Dated Nov. 17, 2011 From the US Patent and Trademark Office Re. U.S. Appl. No. 12/574,787.
Office Action Dated Feb. 20, 2011 From the Israeli Patent Office Re.: Application No. 170428 and Its Translation Into English.
Official Action Dated Mar. 9, 2011 From the US Patent and Trademark Office Re. U.S. Appl. No. 12/574,787.
Response Dated Apr. 4, 2011 to Official Action of Mar. 9, 2011 From the US Patent and Trademark Office Re. U.S. Appl. No. 12/574,787.
Response Dated Apr. 7, 2011 to Official Action of Dec. 8, 2010 From the US Patent and Trademark Office Re.: U.S. Appl. No. 10/927,044.

Official Action Dated May 27, 2011 From the US Patent and Trademark Office Re. U.S. Appl. No. 12/574,787.
Response Dated Sep. 22, 2011 to Official Action of Jun. 22, 2011 From the US Patent and Trademark Office Re.: U.S. Appl. No. 10/927,044.
Office Action Dated Apr. 27, 2010 From the Israeli Patent Office Re.: Application No. 170428 and Its Translation Into English.
Response Dated Apr. 14, 2010 to Official Action of Jan. 19, 2010 From the US Patent and Trademark Office Re.: U.S. Appl. No. 10/927,044.
Official Action Dated Jun. 7, 2010 From the US Patent and Trademark Office Re.: U.S. Appl. No. 10/927,044.
Notice of Allowance Dated Jun. 1, 2012 From the US Patent and Trademark Office Re. U.S. Appl. No. 12/574,787.
Examiner's Answer Before the Board of Patents Appeals and Interferences Dated Nov. 6, 2012 From the US Patent and Trademark Office Re.: U.S. Appl. No. 10/927,044.
Translation of Notice of Reason for Rejection Dated Jun. 17, 2008 From the Japanese Patent Office Re.: Application No. 2002-575825.
Office Action Dated Dec. 23, 2012 From the Israeli Patent Office Re.: Application No. 170428 and Its Translation Into English.
Office Action Dated Feb. 15, 2012 From the Israeli Patent Office Re.: Application No. 170428 and Its Translation Into English.
Official Action Dated Jun. 22, 2011 From the US Patent and Trademark Office Re.: U.S. Appl. No. 10/927,044.
Response Dated Jul. 7, 2011 to Office Action of Feb. 20, 2011 From the Israeli Patent Office Re.: Application No. 170428.

* cited by examiner

APPARATUS AND METHOD FOR CONTROLLING UNAUTHORIZED DISSEMINATION OF ELECTRONIC MAIL

CROSS-REFERENCE TO RELATED APPLICATIONS

This application is related to and claims priority from U.S. Provisional Patent Application No. 60/353,997, filed Feb. 5, 2002, the contents of which are hereby incorporated by reference.

FIELD OF THE INVENTION

The present invention relates to monitoring transport of electronic documents, more particularly but not exclusively to such monitoring for the enforcement of secrecy and confidentiality.

BACKGROUND OF THE INVENTION

Modern businesses and industries rely heavily on the creation, storage and transportation of digital documents and other kinds of digital files as a primary means of communication, information storage, and documentation. In many cases, the digital documents and files contain proprietary and/or confidential material. These documents and files may easily be disseminated in an unauthorized manner using standard electronic mail. Companies are therefore at daily risk of disclosing sensitive internal documents, leading to substantial financial losses. Banking, legal, medical, government, and manufacturing companies have much to lose if sensitive internal documents are leaked. The safe distribution of internal documents, memos, blueprints, payroll records, patient medical information, banking and financial transactions etc, is becoming more complex to ensure. In fact, as a consequence of such leaks, the United States federal government was prompted to intervene and has mandated that companies should protect sensitive information such as financial and patient medical records. From the company and business standpoint, potential risks include financial losses, fiduciary risks, legal problems, competitive intelligence, public relations problems, loss of clients and privacy liability. There is therefore a great interest in methods that mitigate disclosure of confidential digital documents.

One of the greatest obstacles to a reliable security system and mechanism is what known as "the human factor": methods and systems for securing digital documents and digital media content that require the user to perform tedious and/or cumbersome operations in order to secure the media are rendered, in many cases, ineffective. If the user does not perform the required operations, the digital documents and the digital media remain unprotected, regardless of the strength of the basic security mechanism which underlies the system. It is therefore vital for any practical security system to be "user friendly", such that the very action of securing the digital documents and the digital media will be a natural part of the workflow. Many of the currently used security procedures are not embedded into the natural workflow, thereby effectively discourage the users from follow the established security procedure by making it possible to neglect to use those procedures without effecting the workflow, thereby effectively causing an overall decrease in the total security level.

Another important aspect of successful security system is its compatibility with current standards and formats and with popular mailing software. Many security systems do not comply with popular formats and software which enjoy a large customer base. Such security systems present a hazard for potential costumers, regardless of the security and the sophistication of the underlying mechanism.

Another important aspect of securing documents and other confidential material, which does not exist in some of the current systems, is an effective classification method. Since there is a cost and overhead for any level of security, the level of confidentiality may be matched by different protection measures, in a manner that would balance the hazards of unauthorized disclosure and the overall cost of the protection measures, in order to assure that the system is cost-effective and that the classification tags are being taken seriously by the users There is thus a recognized need for, and it would be highly advantageous to have, a method and system that allows control of unauthorized dissemination of electronic mail, which overcomes the drawbacks of current methods as described above.

SUMMARY OF THE INVENTION

The present invention seeks to provide a novel method and system for the mitigation of illegal and unauthorized disclosure of electronic documents, without otherwise interfering with rightful usage and the privacy of the users. Specifically, the current invention provides methods for constructing a user-friendly e-mail security system that is compatible with current modes of operation and current electronic mailing software and standards.

According to a first aspect of the present invention there is provided a method for classification and enforcement of security requirements in an information dissemination system, where the information dissemination system is not designed for the specification and enforcement comprising the steps of:

A user specifying the security requirements for dissemination of a the information, the specifying is done using a user interface;

An enforcement module operable to perform the enforcement receiving the security requirements; and     The enforcement module enforcing the security requirements.

In another preferred embodiment of the present invention, the security requirements are specified implicitly, by classifying the information, the classification implies the security requirements.

In another preferred embodiment of the present invention, the classification comprises at least one of the following:

The identity of the information;
    The authorized recipient groups of the information;
    The authorized recipients of the information;
    The authorized sender groups of the information;
    The authorized senders of the information;
    The security level of the information;
    The allowed destination and sending methods of the information;
    The allowed sending methods of the information;
    The confidentiality level of the information;
    The secrecy level of the information; and
    The subject of the information.

In another preferred embodiment of the present invention, the security requirements comprise requirements about at least one of the following:

The authorized recipient groups of the information;
    The authorized recipients of the information;
    The authorized sender groups of the information;
    The authorized senders of the information;
    The security level of the information;

The allowed destination and sending methods of the information; and

The allowed sending methods of the information.

In another preferred embodiment of the present invention, the information comprises at least one of the following:

At least one E-mail message;
At least one document; and
At least one file.

In another preferred embodiment of the present invention, the security requirements are stored in at least one of the following:

Embedded in the information;
In meta data;
In the access control data;
In a database; and
In the enforcement module.

In another preferred embodiment of the present invention, the information comprises at least one E-mail message, and the security requirements are embedded in at least one of the following:

At least one attachment;
In meta data;
In the access control data;
In at least one header; and
In the message's body.

In another preferred embodiment of the present invention, the enforcement module comprises at least one of the following:

A mail server add-in operable to interface a mail server and to enforce the security requirements on the mail server's mail traffic; and
A mail security server operable to intercept mail messages from a mail server and enforce the security requirements on the mail server's mail traffic.

In another preferred embodiment of the present invention, the information dissemination system comprises software, and the method is implemented by at least one of the following:

implementing an extension to the mailing software;
intrinsic support within the mailing software;
at least one external software utility;
at least one component object model (COM) object;
at least one COM object utilizing add-in interface in the dissemination software;
at least one outlook plug-in;
Extending the meaning at least one existing data storage field;
Extending the meaning of at least one existing data field in a protocol;
Extending the meaning of at least one existing data entry field in an existing user interface;
Changing enumerated type ranges;
Expanding enumerated type ranges;
Additional user interface;
Additional user interface supported by handling at least one event in the dissemination software;
Additional user interface supported by at least one additional property sheet;
Additional user interface supported by at least one additional command bar;
Additional user interface supported by at least one additional command bar button;
Additional user interface supported by at least one COM object;
Additional user interface supported by at least one ActiveX® control;
Additional user interface supported by at least one COM object utilizing an add-in interface in the dissemination software;
Additional user interface supported by at least one outlook plug-in;
Additional user interface supported by implementing at least one extension to the mailing software;
Additional user interface supported by intrinsic support within the mailing software; and
Additional user interface supported by at least one external software utility.

In another preferred embodiment of the present invention, the enforcement comprises at least one of the following:

Blocking the dissemination of the information;
Requiring authorization by an authorized party for the sending of the information;
Changing the information;
removing parts of the information;
Logging dissemination of the information; and
Alerting about dissemination of the information.

In another preferred embodiment of the present invention, the information dissemination system comprises at least one of the following:

IBM® Lotus. Notes®;
IBM® Lotus® Domino® server;
Microsoft® Exchange server;
Microsoft® Outlook®; and
Microsoft® Outlook® Express.

In another preferred embodiment of the present invention, the information dissemination system comprises Microsoft® Outlook® and the method is implemented by utilizing at least one of the following fields:

categories;
user properties;
companies;
sensitivity;
importance;
mileage; and
billing.

According to a second aspect of the present invention there is provided a system for classification and enforcement of security requirements operating in conjunction with an information dissemination system, where the information dissemination system is not designed for the specification and enforcement, the system for classification and enforcement of security requirements comprising:

A user interface for specifying the security requirements for dissemination of a the information; and
An enforcement module operable to perform the enforcement and to receive the security requirements.

In another preferred embodiment of the present invention, the security requirements are specified implicitly, by classifying the information, the classification implies the security requirements.

In another preferred embodiment of the present invention, the classification comprises at least one of the following:

The identity of the information;
The authorized recipient groups of the information;
The authorized recipients of the information;
The authorized sender groups of the information;
The authorized senders of the information;
The security level of the information;
The allowed destination and sending methods of the information;
The allowed sending methods of the information;
The confidentiality level of the information;

The secrecy level of the information; and
The subject of the information.

In another preferred embodiment of the present invention, the security requirements comprise requirements about at least one of the following:
The authorized recipient groups of the information;
The authorized recipients of the information;
The authorized sender groups of the information;
The authorized senders of the information;
The security level of the information;
The allowed destination and sending methods of the information; and
The allowed sending methods of the information.

In another preferred embodiment of the present invention, the information comprises at least one of the following:
At least one E-mail message;
At least one document; and
At least one file.

In another preferred embodiment of the present invention, the security requirements are stored in at least one of the following:
Embedded in the information;
In meta data;
In the access control data;
In a database; and
In the enforcement module.

In another preferred embodiment of the present invention, the information comprises at least one E-mail message, and the security requirements are embedded in at least one of the following:
At least one attachment;
In meta data;
In the access control data;
In at least one header; and
In the message's body.

In another preferred embodiment of the present invention, the enforcement module comprises at least one of the following:
A mail server add-in operable to interface a mail server and to enforce the security requirements on the mail server's mail traffic; and
A mail security server operable to intercept mail messages from a mail server and enforce the security requirements on the mail server's mail traffic.

In another preferred embodiment of the present invention, the information dissemination system comprises software, and the system for classification and enforcement of security requirements is implemented by at least one of the following:
implementing an extension to the mailing software;
intrinsic support within the mailing software;
at least one external software utility;
at least one COM object;
at least one COM object utilizing add-in interface in the dissemination software;
at least one outlook plug-in;
Extending the meaning of at least one existing data storage field;
Extending the meaning of at least one existing data field in a protocol;
Extending the meaning of at least one existing data entry field in an existing user interface;
Changing enumerated type ranges;
Expanding enumerated type ranges;
Additional user interface;
Additional user interface supported by handling at least one event in the dissemination software;
Additional user interface supported by at least one additional property sheet;
Additional user interface supported by at least one additional command bar;
Additional user interface supported by at least one additional command bar button;
Additional user interface supported by at least one COM object;
Additional user interface supported by at least one ActiveX® control;
Additional user interface supported by at least one COM object utilizing an add-in interface in the dissemination software;
Additional user interface supported by at least one outlook plug-in;
Additional user interface supported by implementing at least one extension to the mailing software;
Additional user interface supported by intrinsic support within the mailing software; and
Additional user interface supported by at least one external software utility.

In another preferred embodiment of the present invention, the enforcement comprises at least one of the following:
Blocking the dissemination of the information;
Requiring authorization by an authorized party for the sending of the information;
Changing the information;
removing parts of the information;
Logging dissemination of the information; and
Alerting about dissemination of the information.

In another preferred embodiment of the present invention, the information dissemination system comprises at least one of the following;
IBM® Lotus Notes®;
IBM® Lotus® Domino® server;
Microsoft® Exchange server;
Microsoft® Outlook®; and
Microsoft® Outlook® Express.

In another preferred embodiment of the present invention, the information dissemination system comprises Microsoft® Outlook® and the system for classification and enforcement of security requirements is implemented by utilizing at least one of the following fields:
categories;
user properties;
companies;
sensitivity;
importance;
mileage; and
billing.

The present invention successfully addresses the shortcomings of the presently known configurations by providing a method and system for for controlling unauthorized dissemination of electronic mail, which can efficiently serve digital information protection.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2 is a simplified illustration showing a conceptual illustration of a system, substantially similar to the system described in FIG. 1, but in which, additionally, classification information as well as identifying data are registered in a data storage associated with the mail server security add-in;

DETAILED DESCRIPTION OF PREFERRED EMBODIMENTS

The present embodiments deal, generally speaking, with protection against unauthorized dissemination of classified digital documents.

In a preferred embodiment of the present invention, the method provides a utility that allows the leverage of current features to create classification of security requirements, to be utilized by components of the security system, in order to govern the routing of e-mail messages.

In a preferred embodiment of the present invention the user uses a user interface in order to provide details regarding the required security handling policies with respect to the content of the mail he or she creates. These details may, for example, include limitation on distribution such as authorized recipients groups or security and confidentiality level. After these details are entered, the system enforces the indicated handling of outgoing mail by intercepting and blocking mails whose destination and sending method is not allowed according to those details. In a preferred embodiment of the present invention the system alerts authorized personnel and/or the sender and/or the original composer of the mail when blocking occurs. In another preferred embodiment of the present invention, the mail is not blocked for certain security handling policies and only the alerting occurs. In another preferred embodiment of the present invention, for certain security handling policies, the blocked mails can be sent by authorized users in order to override the blocking action In a preferred embodiment of the present invention the user interface is integrated into the mailing software by implementing an extension to the mailing software.

In another preferred embodiment of the present invention the user interface is integrated into the mailing software by intrinsic support within the mailing software.

In another preferred embodiment of the present invention the user interface is integrated into the mailing software by an external utility.

In another preferred embodiment of the present invention the user interface is integrated into the mailing software by a combination of an external utility and an extension of the mailing software and/or intrinsic support within the mailing software.

In a preferred embodiment of the present invention, the mailing software is Microsoft® Outlook®.

In a preferred embodiment of the present invention Outlook® is extended by implementing a COM (Microsoft® Component Object Model) object preferably implemented as a dynamic link library—DLL, which utilizes Outlook® Add-In support COM interfaces. This is referred to as an Outlook® Add-In.

In another preferred embodiment of the present invention, the mailing software is Microsoft® Outlook® Express.

In a preferred embodiment of the present invention, an existing interface is extended as part of the user interface support (for example the sensitivity drop-down box in Microsoft® Outlook®.

In a preferred embodiment of the present invention, a property sheet is added to the options interface as part of the user interface support.

In another preferred embodiment of the present invention, a command bar button is added as part of the user interface support.

In another preferred embodiment of the present invention, some of the events (for example composing a new mail, or sending mail) are handled as part of the user interface support (e.g. causing a window to pop up).

In another preferred embodiment of the present invention windows in which user interaction is possible are parts of the user interface support.

In a preferred embodiment of the present invention ActiveX® controls (a specialized kind of COM objects conforming to a specified interface) are utilized as part of the user interface support.

In a preferred embodiment of the present invention an external utility handles events in the mailing software and implements part of the user interface support.

In a preferred embodiment of the present invention, part of the user interface support in Microsoft® Outlook® include utilizing the categories and/or sensitivity and/or importance fields in order to reduce (or eliminate) the need to implement an extension. E.g. a distribution groups can be indicated by some of the categories selected and sensitivity can indicate the confidentiality level classification.

In a preferred embodiment of the present invention, part of the user interface support in Microsoft® Outlook® extending and/or changing the sensitivity and/or importance fields' underling enumerated type ranges.

In a preferred embodiment of the present invention, part of the user interface support in Microsoft® Outlook® includes utilizing the mileage and/or the billing information and/or the companies.

In a preferred embodiment of the present invention, part of the user interface support in Microsoft® Outlook® includes utilizing the user properties fields that provides support for adding named property fields.

In a preferred embodiment of the present invention some of the information is embedded in mail headers and/or attachments Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
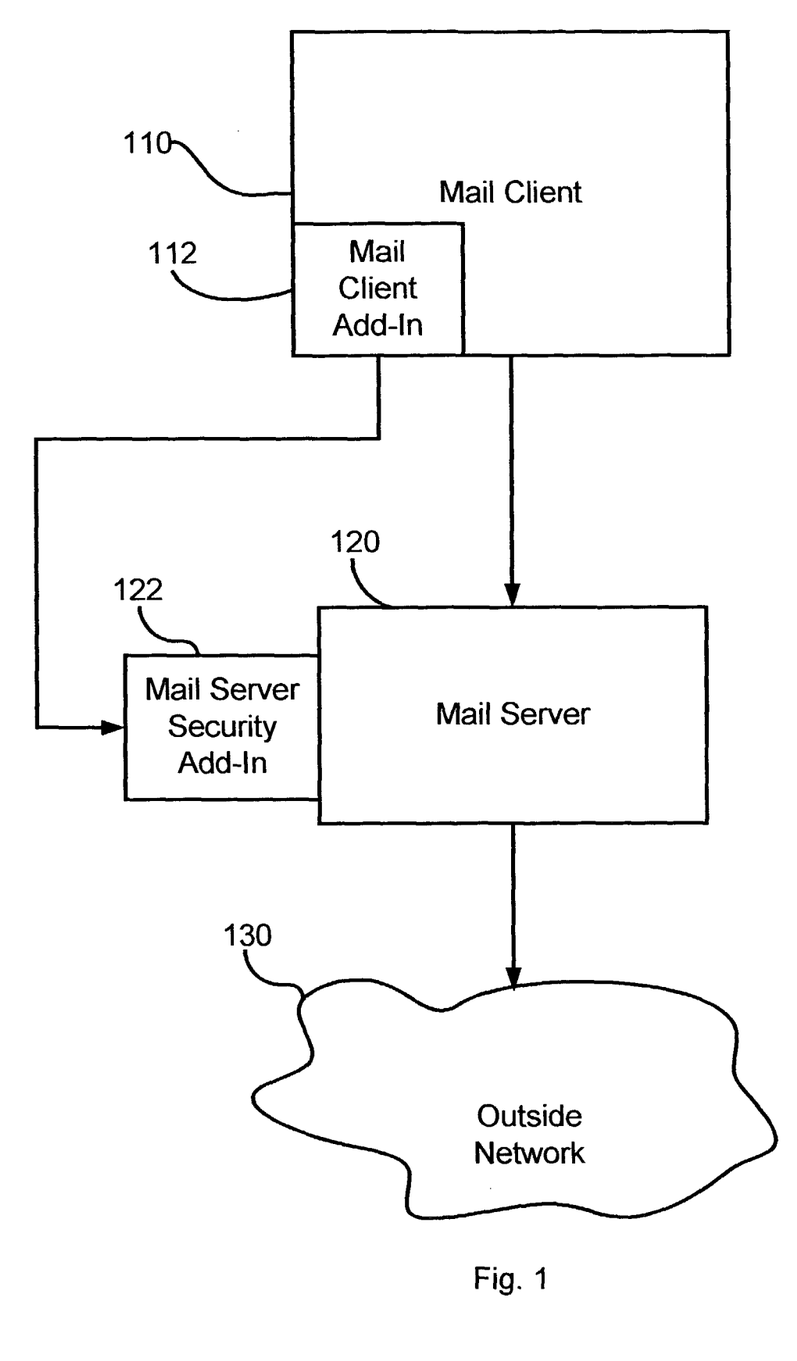
FIG. 1 is a simplified conceptual illustration of a system for content segregation and classification of confidential content, constructed and operative in accordance with a preferred embodiment of the present invention.

Reference is firstly made to FIG. 1, which is a simplified illustration showing a conceptual view of a system that allows for content segregation and classification of confidential content, constructed and operative according to a preferred embodiment of the present invention. A mail client 110 is equipped with a mail client add-in 112. The mail client add-in 112 provides the user with an interface, which facilitates classifying authored mail-messages and the like. A classification tag is embedded in the outgoing mail, thereby facilitating its classification, after its interception by the mail sever security add-in 122, whereafter it is sent via the mail server 120 to outside network 130. If the classification tag indicates that the intended recipients are authorized, the mail server sends it to its intended recipients, otherwise it is blocked. The classification may indicate other handling methods such as alerting, asking an authorized user to authorize the routing of the mail to the as yet unauthorized recipients, etc.

In another preferred embodiment of the present invention, the enforcement module comprises at least one of the following:

A mail server add-in operable to interface a mail server and to enforce the security requirements on the mail server's mail traffic; and A mail security server operable to intercept mail messages from a mail server and enforce the security requirements on the mail server's mail traffic.

In another preferred embodiment of the present invention, the information dissemination system comprises software, and the system for classification and enforcement of security requirements is implemented by at least one of the following:
   implementing an extension to the mailing software;
   intrinsic support within the mailing software;
   at least one external software utility;
   at least one COM object;
   at least one COM object utilizing an add-in interface in the dissemination software;
   at least one Outlook™ plug-in;
   extending the meaning of at least one existing data storage field;
   extending the meaning of at least one existing data field in a protocol;
   extending the meaning of at least one existing data entry entry field
   an existing user interface;
   changing enumerated type ranges;
   expanding enumerated type ranges;
   adding a further user interface;
   adding a further user interface to be supported by handling at least one event in the dissemination software;
   adding a further user interface to be supported by at least one additional property sheet;
   adding a further user interface to be supported by at least one additional command bar;
   adding a further user interface to be supported by at least one additional command bar button;
   adding a further user interface to be supported by at least one COM object;
   adding a further user interface to be supported by at least one ActiveX control;
   adding a further user interface to be supported by at least one COM object utilizing an add-in interface in the dissemination software;
   adding a further user interface to be supported by at least one Outlook™ plug-in;
   adding a further user interface to be supported by implementing at least one extension to the mailing software;
   adding a further user interface to be supported by intrinsic support within the mailing software; and
   adding a further user interface to be supported by at least one external software utility.

Figure 2:
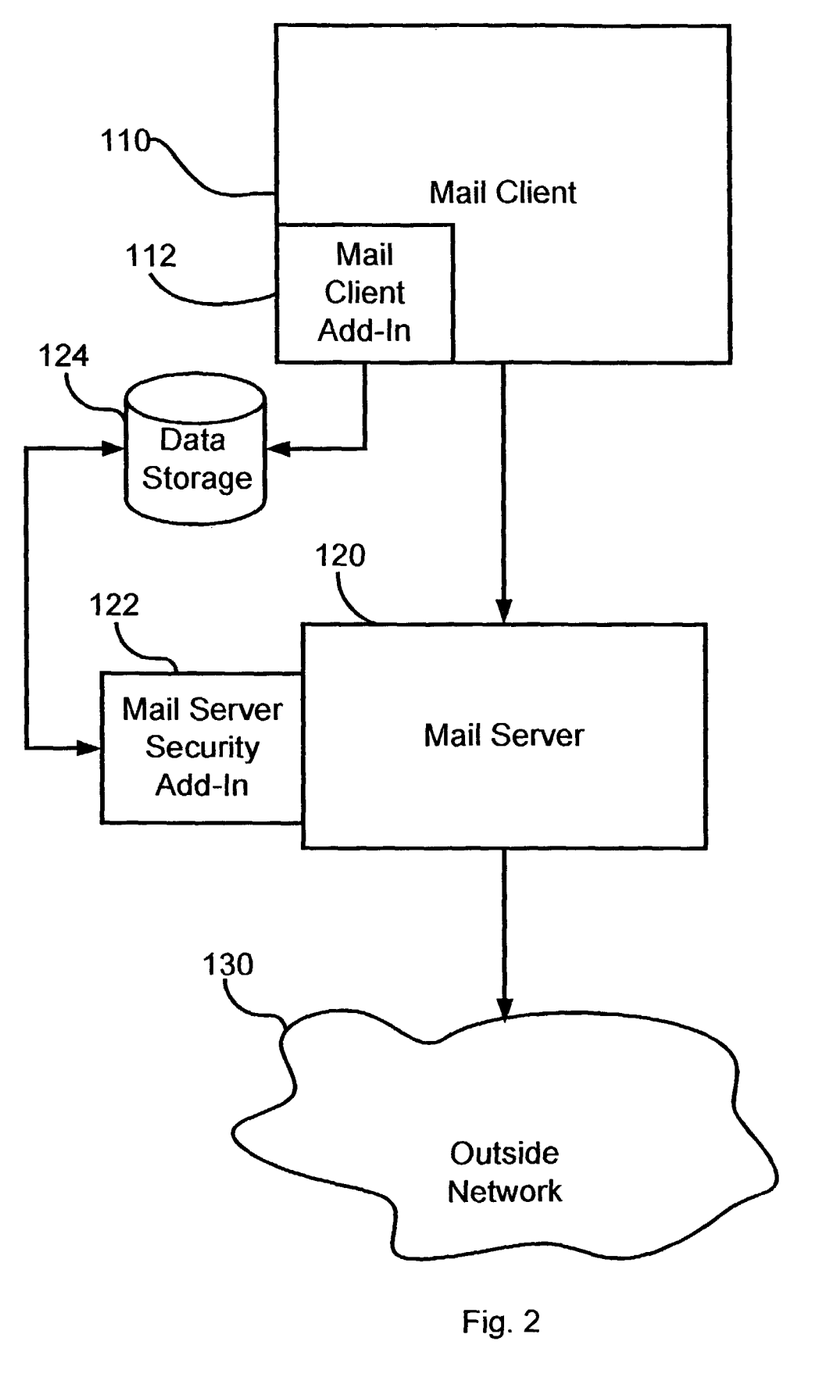

Reference is now made to FIG. 2, which is a simplified illustration showing a conceptual illustration of a system, substantially similar to the system described in FIG. 1, constructed and operative in accordance with a further preferred embodiment of the present invention. Parts that are the same as in previous figures are given the same reference numerals and are not described again except to the extent necessary for an understanding of the present figure. In the embodiment of FIG. 2, the classification of the mail messages is not embedded in the messages themselves. Instead, classification information, as well as identifying data, are registered in a data storage 124 associated with the mail server security add-in 122.

Figure 3:
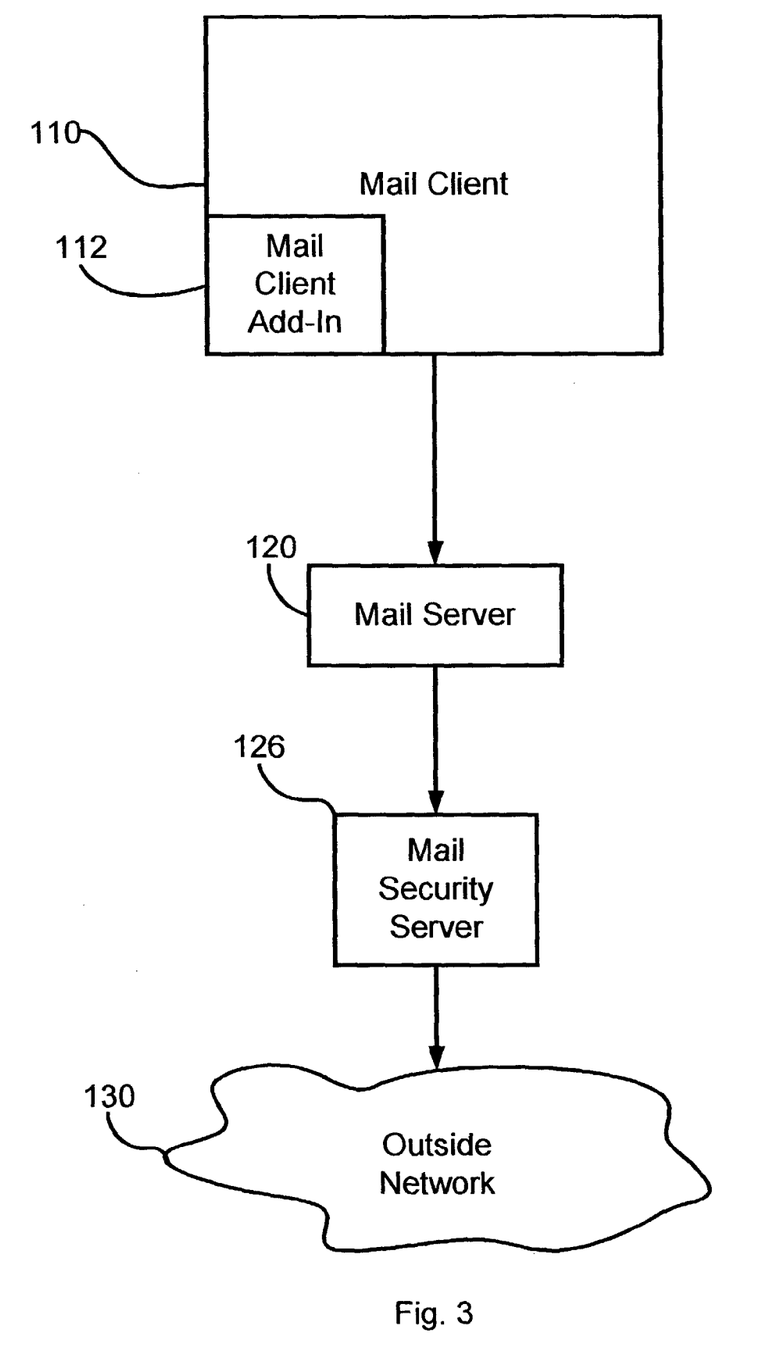
FIG. 3 is a simplified illustration showing a system, substantially similar to the system described in FIG. 1, where a mail security server is charged with the interception and classification of outgoing mail and of handling it accordingly.

Reference is now made to FIG. 3, which is a simplified illustration showing a conceptual illustration of a system which is substantially similar to the system described in FIG. 1, constructed and operative in accordance with a preferred embodiment of the present invention. Parts that are the same as in previous figures are given the same reference numerals and are not described again except to the extent necessary for an understanding of the present figure. In the system of FIG. 3, a mail security server 126 is charged with the interception and classification of outgoing mail and handling of the mail accordingly.

Figure 4:
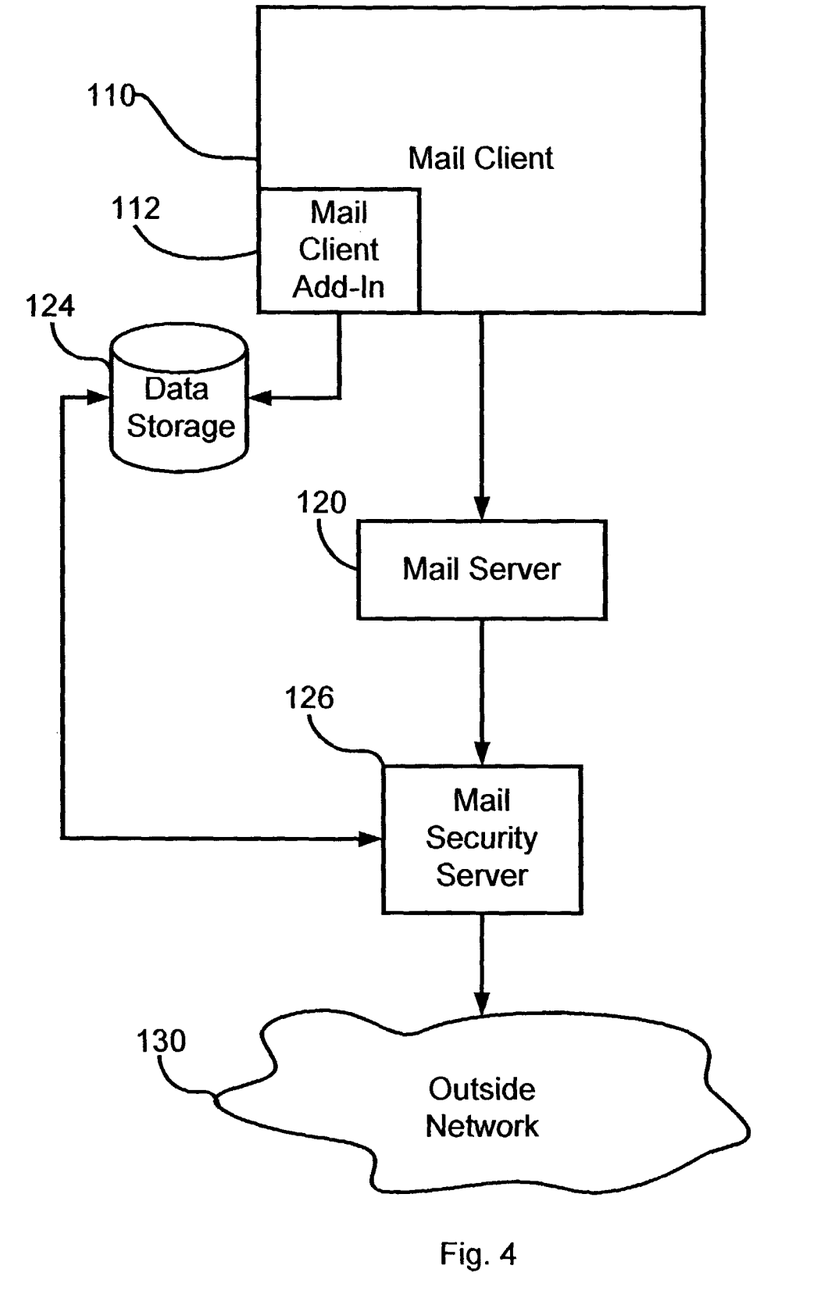
FIG. 4 is a simplified illustration showing a system, substantially similar to the system described in FIG. 2, where a mail security server is charged with the interception and classification of outgoing mail and of handling it accordingly.

Reference is now made to FIG. 4, which is a simplified illustration showing a conceptual illustration of a system, substantially similar to the system described in FIG. 3, constructed and operative in accordance with a preferred embodiment of the present invention. Parts that are the same as in previous figures are given the same reference numerals and are not described again except to the extent necessary for an understanding of the present figure. In the system of FIG. 4, classification information as well as identifying data are registered in a data storage unit 124 associated with the mail security server 126, which is charged with the interception and classification of outgoing mail, and handling of the mail accordingly.

Figure 5:
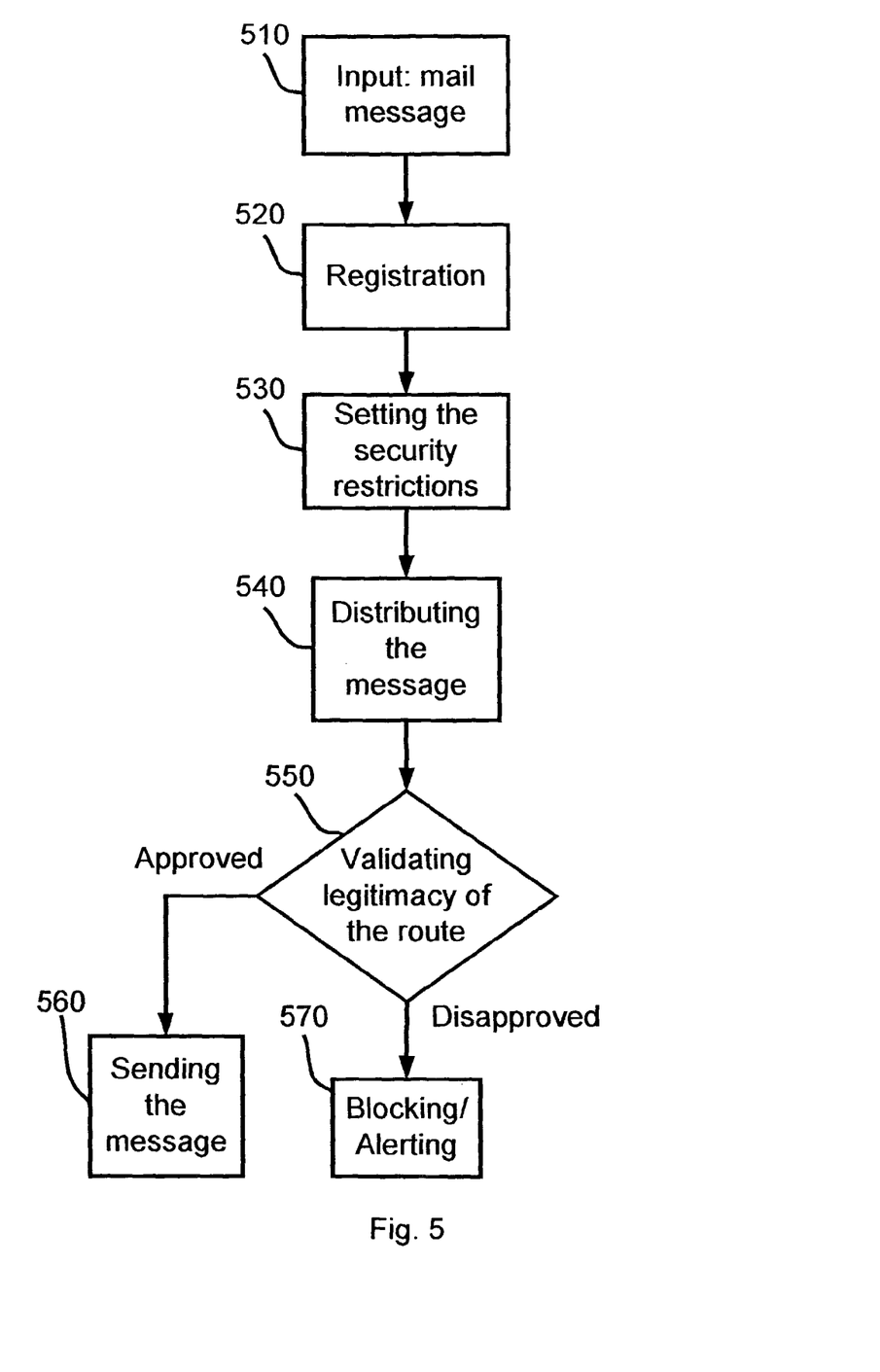
FIG. 5 is a simplified flowchart illustrating a workflow of the method in a preferred embodiment of the present invention.

Reference is now made to FIG. 5, which is a simplified flowchart illustrating workflow of a method of restricting mail distribution in accordance with a preferred embodiment of the present invention. First of all, a mail message input 510 is obtained, typically through user generation. The input is registered 520 and security restrictions 530 are set. Afterward, when the message is distributed 540, the legitimacy of the intended destination and sending method and recipients are validated 550. If the message is approved it is then sent 560. Otherwise it is blocked 570, and possibly an alert is issued.

In another preferred embodiment of the present invention, the security requirements comprise requirements about at least one of the following:
   authorized recipient groups of the information;
   authorized recipients of the information;
   authorized sender groups of the information;
   authorized senders of the information;
   security level of the information;
   allowed destination and sending methods of the information; and
   allowed sending methods of the information.

For example, a user with a secret security classification may not be allowed to send top secret classified information to external recipients, or may only be allowed to send secret classified information when encrypted or to a restricted set of recipients.

In another preferred embodiment of the present invention, the security requirements are stored in at least one of the following ways:
  embedded in the information;
  in meta data;
  in the access control data;
  in a database; and
  in the enforcement module.

In another preferred embodiment of the present invention, the information comprises at least one E-mail message, and the security requirements are embedded in at least one of the following:
  at least one attachment;
  in meta data;
  in the access control data;
  in at least one header; and
  in the message's body.

In another preferred embodiment of the present invention, enforcement is carried out using at least one of the following:
  blocking the dissemination of the information;
  requiring authorization by an authorized party for the sending of the information;
  changing the information;
  removing parts of the information;
  logging dissemination of the information; and
  alerting about dissemination of the information.

In another preferred embodiment of the present invention, the information dissemination system comprises Microsoft Outlook™ and the system for classification and enforcement of security requirements is implemented by utilizing at least one of the following fields:
  categories;
  user properties;
  companies;
  sensitivity;
  importance;
  mileage; and
  billing.

The default values of those fields may be changed, or interpreted in a way which would encourage the user to utilize these fields, for example, by changing the normal workflow for these values (e.g. by displaying a message box, or blocking the sending of the information for some or all recipients).

In a preferred embodiment of the present invention the user uses a user interface in order to provide details regarding the required security handling policies of the mail she or he creates. These details may include, for example, limitations on distribution such as to authorized recipients or groups thereof or confidentiality level classification. After these details are entered, the system enforces the indicated handling of outgoing mail by intercepting and blocking mails whose destination and sending method is not allowed according to those details. The system may also alert authorized personnel and/or the sender and/or the original composer of the mail when a block occurs. In another preferred embodiment of the present invention, according to certain security handling policies, the mail is not actually blocked, but only the alerting occurs. In another preferred embodiment of the present invention, for certain security handling policies, the blocked mails can be resent by authorized users in order to override the block, thereby allowing recovery from system errors.

In a preferred embodiment of the present invention the user interface is integrated into the mailing software by implementing an extension to the mailing software, by intrinsic support within the mailing software, by an external utility or by combination of the above.

In a preferred embodiment of the present invention, the mailing software is Microsoft® Outlook®.

In a preferred embodiment of the present invention Microsoft® Outlook® mailing software is extended by implementing a COM (Microsoft® Component Object Model) object, preferably implemented as a dynamic link library—DLL, which utilizes Outlook® Add-In support COM interfaces. This is referred to as an Outlook® Add-In.

In another preferred embodiment of the present invention, the mailing software is Microsoft® Outlook® Express.

In a preferred embodiment of the present invention, an existing interface is extended as part of the user interface support, for example the sensitivity drop-down box in Microsoft® Outlook®.

In a preferred embodiment of the present invention, a property sheet is added to the options interface as part of the user interface support. Adding such a property sheet enables the addition of data entry fields to the user interface.

In another preferred embodiment of the present invention, a command bar button is added as part of the user interface support.

In another preferred embodiment of the present invention, some of the events (e.g., composing a new mail or sending mail) are handled as part of the user interface support (e.g. causing a window to pop up).

In another preferred embodiment of the present invention, windows in which user interaction is possible are parts of the user interface support.

In a preferred embodiment of the present invention, ActiveX® controls (i.e., a specialized kind of COM objects conforming to a specified interface) are utilized as part of the user interface support.

In a preferred embodiment of the present invention, an external utility handles events in the mailing software and implements part of the user interface support.

In a preferred embodiment of the present invention, part of the user interface support in Microsoft® Outlook® includes utilizing the categories and/or sensitivity and/or importance fields in order to reduce or eliminate the need to implement an extension. E.g., distribution groups can be indicated by some of the categories selected and sensitivity can indicate the confidentiality level classification.

In a preferred embodiment of the present invention, part of the user interface support in Microsoft® Outlook® includes extending and/or changing the sensitivity and/or importance fields and/or other enumerated type ranges.

In a preferred embodiment of the present invention, part of the user interface support in Microsoft® Outlook® includes utilizing the mileage and/or the billing I information and/or the companies and/or the user properties fields.

In a preferred embodiment of the present invention, part of the user interface support in Microsoft® Outlook® includes utilizing the ability to add named fields in Microsoft® Outlook® in order to provide classification labels.

In a preferred embodiment of the present invention some of the classification information is embedded in mail headers and/or attachments. (Note that in the case of Microsoft® Outlook®, some of the aforementioned fields are automatically included as headers.)

In a preferred embodiment of the present invention the mailing software is IBM® Lotus® Domino® server or Lotus Notes®, and the information is embedded into the access control data. In another preferred embodiment of the present invention the mailing software is IBM® Lotus® Domino® server or Lotus Notes® and the information is transferred separately from the sent note. In another preferred embodiment of the present invention the mailing software is IBM® Lotus® Domino® server or Lotus Notes® and the information is attached to the note as a part thereof.

It is appreciated that one or more steps of any of the methods described herein may be implemented in a different order than that shown, while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

A number of features have been shown in various combinations in the above embodiments. The skilled person will appreciate that the above combinations are not exhaustive, and all reasonable combinations of the above features are hereby included in the present disclosure.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The invention claimed is:

1. A method for classification and enforcement of security requirements to an existing information dissemination system, the method comprising the steps of:
    providing, to a user of said existing information dissemination system, a user interface for selecting security requirements for user classification of respective information to be distributed, wherein said user comprises a creator of said information to be distributed;
    accepting respective security requirements from said interface for enforcement in respect of dissemination of the corresponding information;
    modifying a definition of an existing message sensitivity field within a header definition of said information dissemination system such that the field within said header carries a classification tag, wherein said classification tag indicates said user classification of said information, said classification indicating information for legitimizing at a sending end prior to sending such that said sending is carried out only as legitimized, said information for legitimizing at a sending end comprising authorized recipients and a legitimate one of a group of sending methods, wherein said message sensitivity field is indicative of a sensitivity of said corresponding information;
    associating with said dissemination system an enforcement module embodied on a computer recordable medium, said module being operable to receive said security requirements via said classification tag, and
    enforcing said dissemination via said module in accordance with said classification tag, such that said information is disseminated to authorized recipients and blocked from other recipients.

2. A method according to claim 1 wherein said classification comprises at least one of the following:
    an identity of said information;
    a specified authorized recipient group of said information;
    a specified authorized recipient of said information;
    an authorized sender group of said information;
    an authorized sender of said information;
    a specified security level of said information;
    a specified allowed destination and sending method of said information;
    a specified confidentiality level of said information;
    a secrecy level of said information; and
    a subject of said information.

3. A method according to claim 1 wherein said security requirements comprise requirements about at least one of the following:
    an authorized recipient group of said information;
    an authorized recipient of said information;
    an authorized sender group of said information;
    an authorized sender of said information;
    a security level of said information;
    an allowed destination and said allowed sending method of said information; and
    said allowed sending method of said information.

4. A method according to claim 1 wherein said information comprises at least one of the following:
    at least one E-mail message;
    at least one document; and
    at least one file.

5. A method according to claim 1 wherein said security requirements are associated with said information via storage in said field in at least one of the following ways:
    embedding as meta data;
    embedding as access control data;
    Storing in a database; and
    Storing in said enforcement module.

6. A method according to claim 1 wherein said information comprises at least one E-mail message, and wherein said security requirements are embedded in at least one of the following:
    in meta data;
    in access control data; and
    in at least one header.

7. A method according to claim 1 wherein said enforcement module comprises at least one of the following:
    a mail server add-in operable to interface a mail server and to enforce said security requirements on mail traffic of said mail server; and
    a mail security server operable to intercept mail messages from a mail server and enforce said security requirements on mail traffic of said mail server.

8. A method according to claim 1 wherein said information dissemination system comprises software embodied on a computer recordable medium, and wherein said method is implemented by at least one of the following:
    implementing an extension to the information dissemination system;
    intrinsic support within the information dissemination system;
    at least one external software utility;
    at least one COM object;
    at least one COM object utilizing add-in interface in said information dissemination system;
    at least one mailing software plug-in;
    extending the meaning of at least one existing data storage field;
    extending the meaning of at least one existing data field in a protocol;
    extending the meaning of at least one existing data entry field in an existing user interface;
    changing enumerated type ranges;

expanding enumerated type ranges;
providing an additional user interface;
providing an additional user interface to be supported by handling at least one event in the dissemination software;
providing an additional user interface to be supported by at least one additional property sheet;
providing an additional user interface to be supported by at least one additional command bar;
providing an additional user interface to be supported by at least one additional command bar button;
providing an additional user interface to be supported by at least one COM object;
providing an additional user interface to be supported by at least one COM object control;
providing an additional user interface supported by at least one COM object utilizing an add-in interface in said dissemination software;
providing an additional user interface to be supported by at least one mailing software plug-in;
providing an additional user interface to be supported by implementing at least one extension to the mailing software;
providing an additional user interface to be supported by intrinsic support within the mailing software; and
providing an additional user interface to be supported by at least one external software utility.

9. A method according to claim 1 wherein said enforcement comprises at least one of the following:
blocking said dissemination of said information;
requiring authorization by an authorized party for the sending of said information;
changing said information;
removing parts of said information;
logging dissemination of said information; and
alerting about dissemination of said information.

10. A method according to claim 1 wherein said information dissemination system comprises at least one mailing software.

11. A method according to claim 1 wherein said information dissemination system comprises mailing software, and wherein said modifying a field further comprises modifying one of:
categories;
user properties;
companies;
importance;
mileage; and
billing.

12. A method according to claim 1, wherein said modifying an existing field comprises extending the meaning of at least one existing data storage field.

13. A method according to claim 1, wherein said modifying an existing field comprises extending the meaning of at least one existing data field in a protocol.

14. A method according to claim 1, wherein said modifying an existing field comprises extending the meaning of at least one existing data entry field in an existing user interface.

15. A method according to claim 1, wherein said modifying an existing field comprises changing enumerated type ranges of said field.

16. A system for classification and enforcement of security requirements operating in conjunction with an existing information dissemination system, said system for classification and enforcement of security requirements comprising:
an add-on integration module, configured for modifying an existing message sensitivity field in a header by changing a definition of said field, the field being of said existing information dissemination system to serve as a classification tag, wherein said classification tag indicates a user content-dependent classification of said information, said classification indicating authorized recipients, wherein said user comprises a creator of said information to be distributed, wherein said message sensitivity field is indicative of a sensitivity of said corresponding information;
a user interface embodied on a computer recordable medium configured for specifying said user's content dependent security requirements for dissemination of information; and
an enforcement module embodied on a computer recordable medium associable with said information dissemination system, operable to receive said security requirements from said interface, and to perform said enforcement via said association in accordance with said classification tag, such as to enable said enforcement module to disseminate said information to authorized recipients and block said information from other recipients;
wherein said interface is configured for receiving classification data for said information including information for legitimizing at said enforcement module prior to sending, such that said sending is carried out only as legitimized, said information for legitimizing by said enforcement module comprising said authorized recipients and a legitimate one of a group of sending methods, and wherein said security requirements are derived from said classification data.

17. A system according to claim 16 wherein said classification data comprises at least one of the following:
identity data of said information;
a specified authorized recipient group for said information;
an authorized recipient for said information;
an authorized sender group for said information;
an authorized sender for said information;
a security level for said information;
an allowed destination and sending method for said information;
a confidentiality level for said information;
a secrecy level for said information; and
a subject for said information.

18. A system according to claim 16 wherein said security requirements comprise requirements about at least one of the following:
an authorized recipient group of said information;
an authorized recipient of said information;
an authorized sender group for said information;
an authorized sender of said information;
a security level of said information;
an allowed destination and said sending method for said information; and
said allowed sending method for said information.

19. A system according to claim 16 wherein said information comprises at least one of the following:
at least one E-mail message;
at least one document; and
at least one file.

20. A system according to claim 16 wherein said security requirements are stored in at least one of the following ways:
by embedding in meta data;
by embedding in the access control data;
by storing in a database; and
by storing in said enforcement module.

21. A system according to claim 16 wherein said information comprises at least one E-mail message, and wherein said security requirements are embedded in at least one of the following:
- at least one attachment;
- in meta data;
- in the access control data; and
- in at least one header.

22. A system according to claim 16 wherein said enforcement module comprises at least one of the following:
- a mail server add-in operable to interface a mail server and to enforce said security requirements on mail traffic of said mail server; and
- a mail security server operable to intercept mail messages from a mail server and enforce said security requirements on mail traffic of said mail server.

23. A system according to claim 16 wherein said information dissemination system comprises software embodied on a computer recordable medium, and wherein said system for classification and enforcement of security requirements is implemented by at least one of the following:
- implementing an extension to the information dissemination system;
- intrinsic support within the information dissemination system;
- at least one external software utility;
- at least one COM object;
- at least one COM object utilizing add-in interface in said dissemination software;
- at least one mailing software plug-in;
- extending the meaning of at least one existing data storage field;
- extending the meaning of at least one existing data field in a protocol;
- extending the meaning of at least one existing data entry field in an existing user interface;
- changing enumerated type ranges;
- expanding enumerated type ranges;
- an additional user interface;
- an additional user interface to be supported by handling at least one event in the dissemination software;
- an additional user interface to be supported by at least one additional property sheet;
- an additional user interface to be supported by at least one additional command bar;
- an additional user interface to be supported by at least one additional command bar button;
- an additional user interface to be supported by at least one COM object;
- an additional user interface to be supported by at least one COM object control;
- an additional user interface to be supported by at least one COM object utilizing an add-in interface in said dissemination software;
- an additional user interface to be supported by at least one mailing software plug-in;
- an additional user interface to be supported by implementing at least one extension to the mailing software;
- an additional user interface to be supported by intrinsic support within the mailing software; and
- an additional user interface to be supported by at least one external software utility.

24. A system according to claim 16 wherein said enforcement module is operable to carry out enforcing by at least one of the following:
- blocking said dissemination of said information;
- requiring authorization by an authorized party for the sending of said information;
- changing said information;
- removing parts of said information;
- logging dissemination of said information; and
- alerting about dissemination of said information.

25. A system according to claim 16 wherein said information dissemination system comprises at least one mailing software.

26. A system according to claim 16 wherein said information dissemination system comprises mailing software, and wherein said modifying a field further comprises modifying one of:
- categories;
- user properties;
- companies;
- importance;
- mileage; and
- billing.

* * * * *